(12) United States Patent
Yang et al.

(10) Patent No.: US 9,722,460 B2
(45) Date of Patent: Aug. 1, 2017

(54) COIL AND FERRITE CONFIGURATION TO FACILITATE NEAR FIELD COUPLING

(75) Inventors: Songnan Yang, San Jose, CA (US);
Emily B. Cooper, Portland, OR (US);
Jim J. Walsh, Santa Clara, CA (US);
Anand S. Konanur, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 13/976,067

(22) PCT Filed: Dec. 21, 2011

(86) PCT No.: PCT/US2011/066351
§ 371 (c)(1),
(2), (4) Date: Apr. 7, 2015

(87) PCT Pub. No.: WO2014/007789
PCT Pub. Date: Jan. 9, 2014

(65) Prior Publication Data
US 2015/0236550 A1    Aug. 20, 2015

(51) Int. Cl.
*H02J 17/00* (2006.01)
*H01Q 1/24* (2006.01)
*H01Q 7/00* (2006.01)
*H01Q 1/22* (2006.01)

(52) U.S. Cl.
CPC ........... *H02J 17/00* (2013.01); *H01Q 1/2266* (2013.01); *H01Q 1/243* (2013.01); *H01Q 7/00* (2013.01)

(58) Field of Classification Search
CPC ....... H02J 17/00; H01Q 1/243; H01Q 1/2266; H01Q 7/00

USPC ................................ 343/702; 455/41.1, 41.2
See application file for complete search history.

(56) References Cited

U.S. PATENT DOCUMENTS

| 7,973,722 | B1 | 7/2011 | Hill et al. |
| 2007/0171079 | A1 | 7/2007 | Saito et al. |
| 2008/0207282 | A1 | 8/2008 | Schaffler |
| 2008/0303632 | A1* | 12/2008 | Hammad .............. G06F 1/1616 340/10.1 |
| 2011/0121084 | A1 | 5/2011 | Laknin et al. |
| 2011/0257703 | A1 | 10/2011 | Kerber et al. |
| 2012/0038443 | A1* | 2/2012 | Kubo ................. G06K 7/10336 336/90 |

FOREIGN PATENT DOCUMENTS

| WO | 2014/007789 A2 | 1/2014 |
| WO | 2014/007789 A3 | 3/2014 |

OTHER PUBLICATIONS

International Search Report and Written Opinion received for PCT Patent Application No. PCT/US2011/066351, mailed on Jan. 28, 2014, 13 pages.

* cited by examiner

*Primary Examiner* — Dameon E Levi
*Assistant Examiner* — David Lotter
(74) *Attorney, Agent, or Firm* — Schiff Hardin LLP

(57) ABSTRACT

Described herein are techniques related to near field coupling (e.g., wireless power transfers (WPF) and near field communications (NFC)) operations among others. This Abstract is submitted with the understanding that it will not be used to interpret or limit the scope or meaning of the claims.

22 Claims, 3 Drawing Sheets

COIL AND FERRITE CONFIGURATION TO FACILITATE NEAR FIELD COUPLING

BACKGROUND

Recently, technologies have arisen that allow near field coupling (such as wireless power transfers (WPT) and near field communications (NFC)) between electronic devices in close proximity to each other and more particularly, thin portable electronic devices. Both near field coupling functions use radio frequency (RF) antennas in each of the devices to transmit and receive electromagnetic signals. Because of user desires (and/or for esthetic reasons) many of these portable devices are small, are becoming smaller as markets evolve, and have exaggerated aspect ratios when viewed from the side (i.e., they are "thin). As a result, many of these thin devices incorporate flat antennas which use coils of conductive material as their radiating (or radiation receiving) antennas for use in near field coupling functions.

However, the small form factor of many devices interferes with the ability of the coils to couple. For instance, objects within the devices and near the coils might divert the flux of the magnetic field away from the coils. Notably, metallic objects tend to divert magnetic flux around themselves and, thus, away from the coils. Moreover, it might be the case that users want to transfer power and/or communicate using the devices without generating a strong magnetic field. Instead, users might prefer to use the often-limited onboard power of these devices to affect other functions (for instance, placing phone calls, receiving phone calls, accessing data/internet over wireless wide area networks (WWAN), such as the 3G ($3^{rd}$ Generation), LTE (Long Term Evolution), etc.).

In addition, users tend to prefer to hold certain devices and/or to set them down in certain orientations. For instance, some devices provide NFC functions by "bumping" the backs of two devices together. This back-to-back bumping is intended to place the coils in the two devices in close proximity to each other and in such a relative orientation that the coils couple relatively well. In some cases the location, shape, etc. of the two coils correspond to each other relatively closely during back-to-back bumps. Yet, for ergonomic reasons, users holding these devices might find it awkward to hold them in an orientation suitable for back-to-back bumping. In other instances, users might wish to affect WPT between the devices while using (or having available for use) one or both devices. Thus, to perform WPT from a laptop computer to a cellular telephone (for instance) users often do not wish to lay the cellular telephone on top of the keyboard of the laptop device (where the relative orientation and proximity of the coils facilitates their coupling). In many cases, users instead prefer to orient the devices involved in a side-by-side configuration. In other words, users often want to bump one side of one device to a side of another device in NFC scenarios and want to leave one device next to another in lengthier WPT scenarios which often require some time to occur.

Unfortunately, with many small form factor (and, more specifically, "thin") devices, side-by-side device orientations limit the ability of the coils in the devices to couple. In such relative orientations, the coils might be rather distant from one another and/or one coil might sense only the fringing field generated at the edge of the other coil. Thus, placing such devices side-by-side might limit the rate at which WPT occurs because the portion of the field which the receiving coil happens to be in is so weak (or the relative orientation of the flux is such) as to limit the coupling of the receiving antenna with the magnetic field. In NFC scenarios, the operating volume (communication distance) and bit rate associated with the communication can be similarly limited by the weak coupling of the coils. Similar considerations also apply to the transmitting coil and its ability to propagate the field in the presence of tightly integrated objects within the transmitting device. Yet users desire WPT and NFC functionality in an increasing number (and variety) of thin devices and they desire those functions with side-by-side operability.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for coupling coil antennas of thin portable electronic devices for (among other uses) improving near field coupling capabilities of the devices. Near field coupling includes (by way of illustration and not limitation) wireless power transfer (WPT) and/or near field communications (NFC) capabilities of the devices.

Figure 1A:
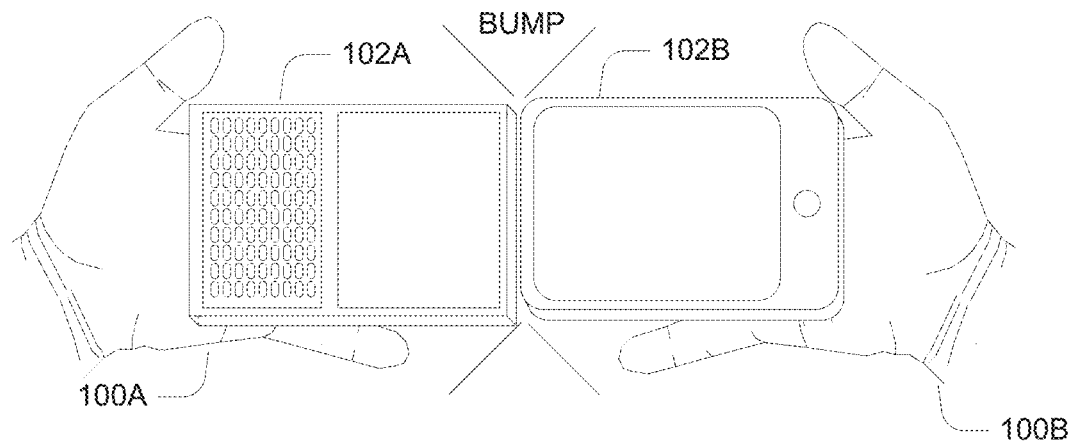
FIGS. 1A and 1B illustrate perspective views of various devices in differing exemplary near field coupling arrangements.
Figure 1B:
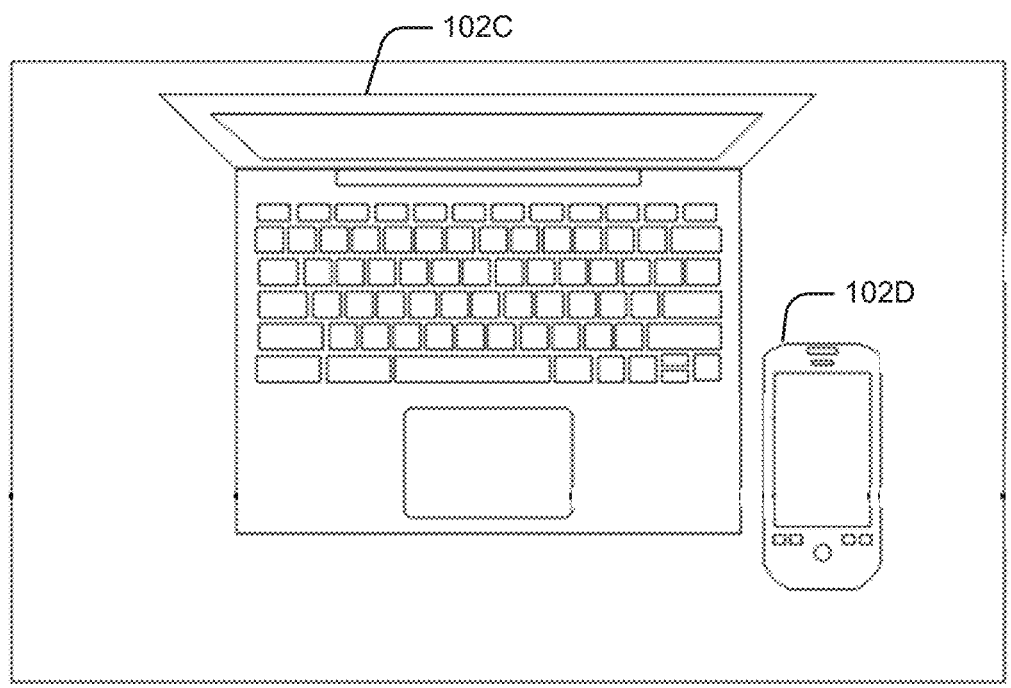

FIGS. 1A and 1B illustrate perspective views of various devices in differing near field coupling arrangements. More particularly, many users have a desire to operate near field coupling enabled portable electronic devices and/or other devices in certain ergonomically convenient manners. Examples of such device include (but are not limited to) phones, cellular phones, smart phones, personal digital assistants, tablet computers, netbook computers, laptop computers, ultrabook computers, and various potentially wireless devices such as pointing devices (mice), keyboards, wireless disks, and the like.

For example, FIG. 1A shows a so-called "NFC bump" where two users 100A and 100B "bump" their NFC-enabled devices 102A and 102B together in an edge-to-edge or head-to-head manner to perform NFC-related information sharing functions. With conventional NFC-enabled devices, the near field coupling would be inefficient or ineffective because of reasons discussed in the Background section. In addition, FIG. 1B shows an often desired side-by-side arrangement of devices (such as laptop 102C and smartphone 102D) for NFC and/or WPT purposes. However, the mechanical integration of near field coupling components in conventional devices constrains the ability of users to effectively employ these desired arrangements. With reference to at least these constraints and/or others, exemplary implementations described herein free users to operate devices as they desire.

Figure 2:
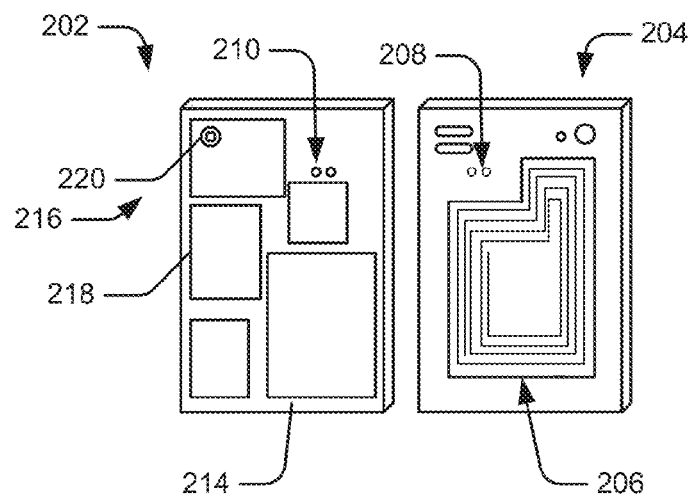
FIG. 2 illustrates a top plan view of a partially disassembled device.

FIG. 2 illustrates a top plan view of a partially disassembled device. The emerging technologies related to near field coupling enable many appealing experiences for users of portable electronic devices. Providers of these devices typically include flat coil antennas in their design so that (in part) the devices can possess the thin aspect ratios and small form factors often sought by users. Moreover, these flat coil antennas allow for mechanical integration into these thin devices with comparative ease (when considering mechanical factors in isolation from other considerations such as the ability of the coils of different devices to couple with one another). For instance, integrating a flat printed circuit board (PCB), which incorporates a coil antenna, into a thin device usually minimizes the increase in the thickness of the device 202 due to the antenna itself.

With continuing reference to FIG. 2, the drawing illustrates a device 202 with its back cover 204 removed (and shown with its inside up). In the current embodiment, the device 202 happens to be a smart phone. However, the device 202 could be any of the variety of available portable electronic devices. With the back cover 204 removed, FIG. 2 illustrates an antenna of this particular device 202 mounted on, embedded in, or otherwise associated with the back cover 204. In the current embodiment the antenna happens to include a flat coil 206 and a pair of contacts 208 which are in electrical communication with the coil 206 and which positioned to electrically communicate with a corresponding pair of contacts 210 on a chassis 212 of the device 202 (shown face down).

FIG. 2 also illustrates that within the chassis 212 of the device 202, the device 202 includes a battery 214, and other metallic components 216 (or components including metallic structures) such as a printed circuit board (PCB) 218, a camera 220, etc. As is disclosed further herein with reference to at least FIG. 3B, when the back cover 204 is placed on the chassis 212, it places the coil 206 in electrical communication with other functional components of the device 202. But it also places the coil 206 in close proximity to some or all of the metallic components 216 (such as the battery 214). Of course, other device 202 configurations are within the scope of the disclosure. For instance, the coil 206 could be on the chassis 212 instead of the back cover 204. In many devices 202 the metallic components 216 deflect the flux of magnetic fields (that might otherwise couple with the coil 206) away from the coil 206.

As a result, when users attempt to perform near field coupling (e.g., WPT and/or NFC) functions between conventional devices, the presence of the metallic components 216 and the relative orientation and distance between the coils 206 inhibits the ability of the coils 206 to couple with the coils of the other device. In turn, the inability of the coils 206 to couple efficiently in conventional scenarios limits the ability to perform near field coupling (e.g., WPT and/or NFC) functions with these devices 202. Accordingly, users cannot use conventional devices in many desired ways or must accept the back-to-back operability limitations of the conventional devices.

With reference again to FIGS. 1A and 1B, the drawing illustrates ways in which the users would like to use the devices 102. In general, users 100A and 100B desire to bump devices 102A and 102B along the sides as illustrated by FIG. 1A. However, due to the constraints imposed on the relative orientation of conventional devices during the bump by the inability of the coils 206 to couple efficiently, users often find that they must bump the conventional devices along their respective backs to enable NFC functions. For some devices, such as cellular telephones, this might be ergonomically feasible. However, for other devices (for instance, tablets) it might not be practicable. In contrast, side-to-side bumping (as shown in FIG. 1A) of devices 102A and 102B allows users 100A and 100B to hold the devices 102A and 102B in ergonomically desirable manners.

Moreover, users often desire to cause WPT functions to occur by placing devices side-by-side with other devices as illustrated in FIG. 1B. In contrast, the inability of the coils 206 to couple efficiently with conventional devices forces users to place such devices on the top of another device (perhaps a charging mat) to cause a WPT function to occur. In some cases, as with a smart phone, users would find it inconvenient to place one device on top of another device (like a laptop computer). Instead, users often prefer placing devices side-by-side so that their sides (as shown in FIG. 1B) are generally proximate to one another. In such situations, the side-by-side placement of devices 102C and 102D allow users to use both devices even while WPT functions might be occurring.

Various embodiments described herein allow users to bump devices side-to-side and to place devices side-by-side for near field coupling functions (such as NFC and WPT) by improving the coupling between the coils 206 of one or more of such devices. More specifically, embodiments provide devices with strategically shaped, and placed, ferrite materials which provide for better coupling of coils 206. Devices of the current embodiment therefore enable new uses of devices 102 in regard to WPT, NFC, and other near field coupling functionality.

As disclosed further herein, devices that implement near field coupling-related functions use the coupling achieved by the coils 206 in those devices. Each of these coils 206 has an inductance associated with it, which can be chosen in conjunction with the resistive, capacitive, and other features of devices 202 to enable a common resonant frequency for the devices 202. In such systems, the transmission efficiency n of power transfers from the transmitting coil 206 to the receiving coil 206 is often described in terms of the quality factors Q of each of the coils and a coupling coefficient k associated with the overall system.

More specifically, Equation 1 describes one such relationship:

$$n = \left(1 - \frac{1}{kQ}\right)^2 \quad \text{Equation 1}$$

Where:

$Q = \text{SQRT}(Q_{TX}Q_{RX})$ $Q_{TX,RX} = wL_{TX,RX}/R_{TX,RX}$ and

TX indicates the transmitting coil, RX indicates the receiving coil, k is a coupling coefficient, and w is a frequency of interest.

Often, in small and/or thin devices 202, mechanical volume constraints restrict the size, shape, etc. of the transmitting and receiving coils 206. For instance, FIG. 2 illustrates that coil 206 deviates from its otherwise generally oblong shape near its upper, left corner. Moreover, the sidebands generated during NFC functions complicate the design of the transmitting and receiving coils 206 further by increasing the range of frequencies associated with those sorts of functions. As a result, the quality factors $Q_{TX}$ and $Q_{RX}$ of the transmitting and receiving coils 206, as well as the system level quality factor Q, might not be optimized for either WPT functions, NFC functions, or both types of functions. Thus, electrical designers of such devices 202 sometimes find that they have little ability to influence the various quality factors $Q_{TX}$, $Q_{RX}$, and Q.

Figure 3A:
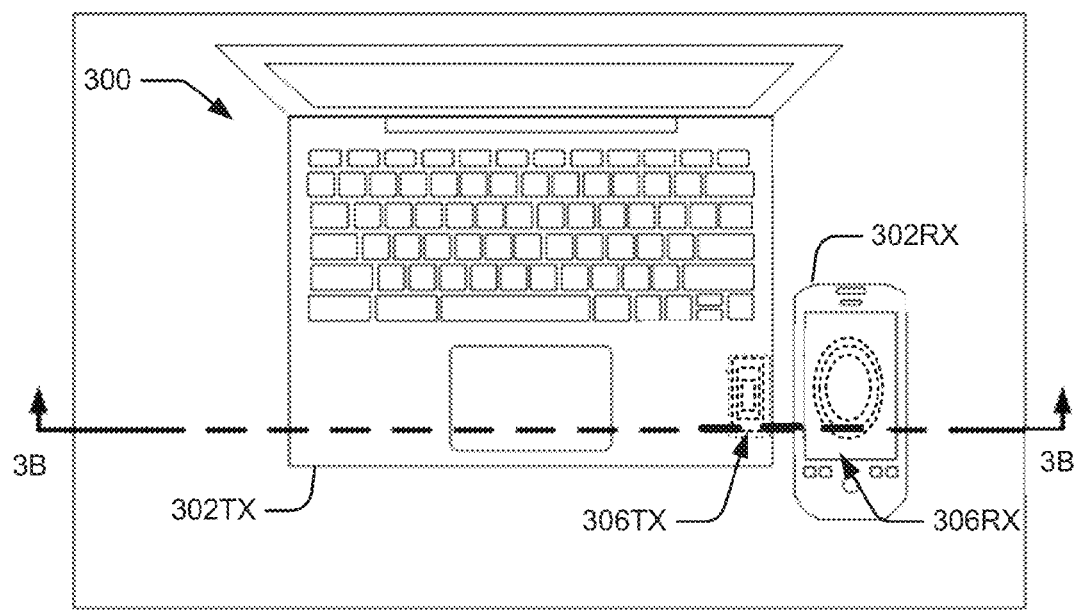
FIG. 3A is a top plan view of a pair of devices.
Figure 3B:
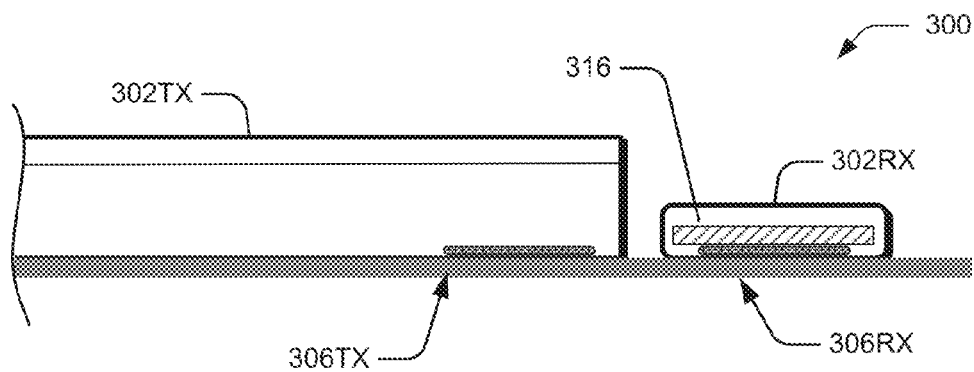
FIG. 3B is a schematic view of transmission and reception coils of a pair of devices.

Nevertheless, embodiments provide systems characterized, in part, by coupling coefficients k designed with WPT and NFC functions in mind. Furthermore, in some embodiments, systems 300 possess coupling coefficients k that enable relatively higher power transmission efficiencies n for WPT functions and frequency ranges sufficiently broad for NFC functions. As is further disclosed herein, these coupling coefficients k depend on how much magnetic flux generated by the transmitting coil 206 penetrates the receiving coil 206 thereby inducing electrical current through that coil. While coupling coefficients k often depend on the geometry of the coils 206, their relative locations, and the number and location of surrounding objects, embodiments provide flux guides, flux shields, flux guides, etc. that influence (and sometimes increase) the coupling coefficients k at frequencies w such as those used in WPT and/or NFC functions. With reference now to FIGS. 3A and 3B, various considerations are disclosed.

FIG. 3A is a top plan view of a pair of devices. More specifically, FIG. 3A illustrates a system 300 which includes two devices $302_{TX}$ and $302_{RX}$. System 300 might arise when a user brings one of the devices 302 into close proximity with the other device 302 as suggested by near field coupling-related protocols. Indeed, one or the other device $302_{TX}$ might reside in a particular location for relatively long periods. In contrast, the other device $302_{RX}$ might be designed to be relatively more mobile and might reside in some location for relatively shorter periods. For instance, device $302_{TX}$ might be a laptop computer and device $302_{RX}$ might be a smart phone as illustrated by FIG. 3A.

Thus, system 300 generally arises as desired by the user or as it might otherwise happen that the devices 302 come into close proximity with each other. In many cases, though, users will want to use both devices 302 while they are in close proximity without constraints imposed by the ability of coils 306 within the devices to couple. Moreover, as is illustrated in FIG. 3A, the locations, orientations, etc. of transmitting and receiving coils $306_{TX}$ and $306_{RX}$ in the transmitting and receiving devices $302_{TX}$ and $302_{RX}$ might not facilitate use of both devices 302 while near field coupling-related functions are occurring. Indeed, to enable such functions, previously available systems 300 often require that receiving device $302_{RX}$ be place on top of the transmitting device $302_{TX}$ to at least partially align and overlap the coils $306_{RX}$ and $306_{TX}$.

In the scenario illustrated by FIG. 3A, the transmitting device $302_{TX}$ includes the transmitting coil $306_{TX}$ near its bottom and toward its front most, right corner. The receiving device $302_{RX}$ includes a coil $306_{RX}$ situated near its geometric center with portions of the receiving device $302_{RX}$ extending outwardly there from. To align and overlap the coils 306 therefore requires that the receiving device $302_{RX}$ be placed on or near the front, right corner of the transmitting device $302_{TX}$. However, in that position it blocks access to much of the keyboard of the transmitting device $302_{TX}$. It also leaves receiving device $302_{RX}$ prone to slipping off transmitting device $302_{TX}$ and in an awkward location for its use. That being said it might now be beneficial to turn to FIG. 3B.

FIG. 3B is a schematic view of transmission and reception coils of a pair of devices. Moreover, FIG. 3B illustrates that with the smaller of the two devices $302_{RX}$ the coil $306_{RX}$ happens to be positioned in close proximity to various components of the receiving device $302_{RX}$ as is often the case. These components, and particularly metallic components 316 such as batteries, PCBs, etc., can significantly interfere with coupling between the transmitting coil $306_{TX}$ and the receiving coil $306_{RX}$. Moreover, it is noted here that such situations can arise because of the often-felt desire to mechanically integrate the physical components of the devices 302 in small and/or thin housings or chasses.

Figure 4:
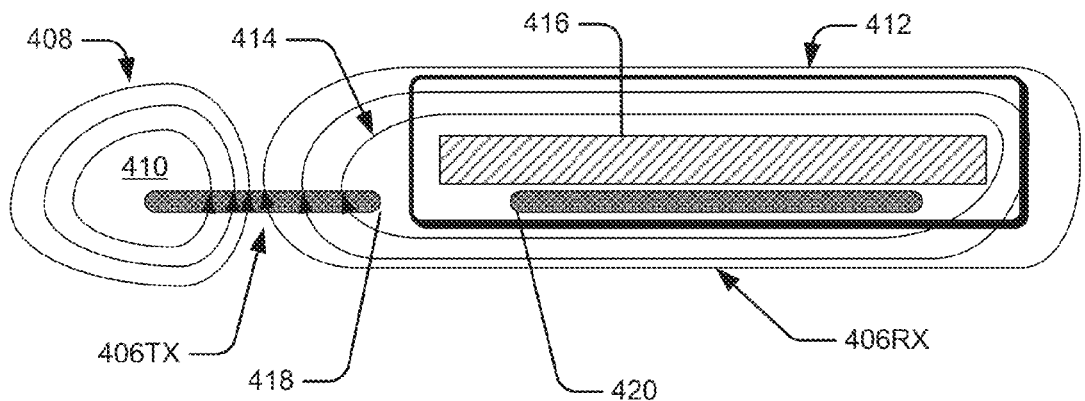
FIG. 4 illustrates a flux pattern associated with a pair of transmitting and receiving coils.

FIG. 4 illustrates a corresponding flux pattern associated with a pair of transmitting and receiving coils. FIG. 4 also illustrate the results of a simplified simulation of how metallic components 416 (and other objects) can divert flux 408 of a magnetic field 410 away from coils 406 in various devices such as thin electronic devices (not shown). However, it is seen in FIG. 4 that the corresponding devices are side-by-side each other. In the simplified simulation, transmitting and receiving coils $406_{TX}$ and $406_{RX}$ of typical thin devices were modeled in close enough proximity to one another so that WPT and NFC (non-limiting near field coupling) functions could occur according to the corresponding protocols. In addition, a typical metallic component 416 was modeled as a metallic box at a distance and relative orientation to the receiving coil $406_{RX}$ typically found in thin devices.

On the left side of FIG. 4, a generally undisturbed pattern of flux 408 is observed near the transmitting coil 406TX, as those skilled in the art will recognize. However, the presence of the metallic component 416 in the right side of the magnetic field 410 alters the magnetic field 410 and thus the flux in its vicinity. More specifically, near the center of the transmitting coil $406_{TX}$ (and at a relatively large distance from the metallic component 416) the flux 408 flows upwardly from the transmitting coil 406 and begins to arc over to the right in a more or less mirror image of the left side of the magnetic field 410. However, eddy currents (not shown) in the metallic component 416 generate their own magnetic fields (not shown) which influence diverted flux 412 to deviate from that mirror image of the magnetic field 410 associated with the left side of the transmitting coil $406_{TX}$. Indeed, under the influence of these eddy-current-induced magnetic fields, the diverted flux 412 tends to flow around the metallic component 416 until it reaches the far end of the metallic component 416. Whereupon, the diverted flux 412 arcs downwardly and thence around the surface of the metallic component 416 opposite the transmitting coil $406_{TX}$ until it returns to the vicinity of the transmitting coil $406_{TX}$. At that general location, the influence of the eddy currents in the metallic component 416 begin to fade and the diverted flux 412 returns to the center of the transmitting coil $406_{TX}$ as illustrated. Thus, the metallic component 416 therefore lowers the apparent inductance of the receiving coil $406_{RX}$ and weakens its coupling with the transmitting coil $406_{TX}$. Of course, as with many devices 402, many metallic components 416 could be in the proximity of either or both coils 406.

In the meantime, the flux 414 of the relatively strong fringing field generated at the edge 418 of the transmitting coil $406_{TX}$ far from the receiving coil $406_{RX}$ (hereinafter "fringing flux 414") follows a similar pattern but on a smaller scale. At the edge 418 of the transmitting coil $406_{TX}$ adjacent to the edge 420 of the receiving coil $406_{RX}$ much of the fringing flux 414 departing the edge 418 encounters the metallic component 416 (or the influence of its eddy currents) and diverts around the same. Thus, the metallic component 416 also blocks and/or limits much of the fringing flux 414 that might have otherwise reached and perhaps have even penetrated the receiving coil $406_{RX}$.

As a result, little or no flux 408, diverted flux 412, or fringing flux 414 can reach much less penetrate the receiving coil $406_{RX}$. Accordingly, the coupling coefficient k of such an arrangement tends to be low perhaps being as little as 0.016 (or worse) with a correspondingly limited system level quality factor Q. With such a low coupling coefficient k, power transfer efficiencies n drop to such low levels that little if any power can be transferred from the transmitting coil $406_{TX}$ to the receiving coil $406_{RX}$. Likewise, the low-efficiency coupling of these coils 406 (in such situations) creates a correspondingly weak electric signal in the receiving coil $406_{RX}$. Thus, if information was encoded into the electrical current driving the transmitting coil $406_{TX}$ it becomes unlikely and/or difficult to recover that signal and hence the information appearing in the electrical current induced in the receiving coil $406_{RX}$. As mechanically integrated into the receiving device $402_{RX}$, metallic components 416 therefore inhibit both WPT and NFC functions. Embodiments, which improve the coupling coefficients k of various side-by-side systems, are disclosed with reference to FIG. 5.

Figure 5:
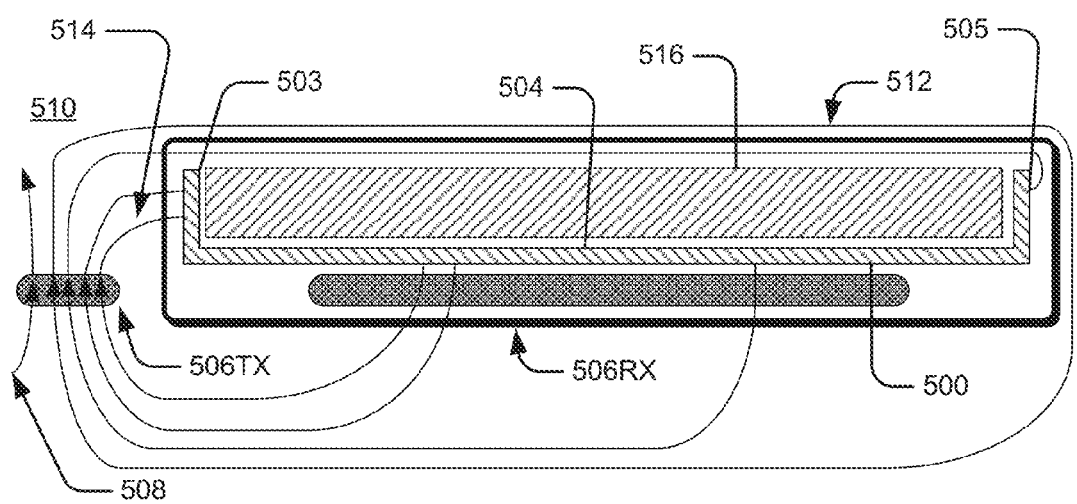
FIG. 5 illustrates a flux pattern of another pair of transmitting and receiving coils.

FIG. 5 illustrates another pair of transmitting and receiving coils. FIG. 5 also illustrates a ferrite guide 500 in accordance with various embodiments. As is disclosed further herein, the ferrite guide 500 acts to guide flux into the receiving coil $506_{RX}$ (and/or out of transmitting coils $506_{TX}$) in close proximity to metallic components 516. Moreover, ferrite guides 500 of embodiments need not be made from ferrite. Rather, they can be made of any material having suitable properties such as electrical conductivity/resistivity, magnetic permeability, etc. As is disclosed further herein, some of these flux guides wrap around one or more metallic components in various devices. And, more specifically, wrap from being in planes generally parallel with the receiving coils into planes that project away from and/or intersect those planes. As a result, embodiments provide devices and systems with coupling coefficients k, efficiencies n, and quality factors Q suitable for side-by-side near field coupling (WPT and NFC) functions.

In the current embodiment, the ferrite guide 500 defines three portions: a planar portion 504 and shield portions 503 and 505. In alternative embodiments, the ferrite guide 500 may have just two portions, such a planar portion 504 and one of the shield portions 503 or 505. In some embodiments, the ferrite guide 500 is made of one continuous sheet of ferrite and is formed into a channel or bowl shape with the shield portions 503 and 505 forming approximately 90-degree angles with the adjoining planar portion 504. However, other angles and configurations are envisioned and within the scope of the disclosure. For instance, ferrite guides of some embodiments only have one shield portion 503 or 505 although some embodiments provide ferrite guides 500 with as many shield portions as might be desired to correspond to the shape of the metallic component(s) 516 with which it will cooperate as disclosed further herein. In some embodiments, the ferrite guides 500 are made from discrete, separate shield portions 503 and 505 and planar portions 504.

With continuing reference to FIG. 5, in the current embodiment, the receiving coil $506_{RX}$ is illustrated as being positioned toward the bottom or base of the receiving device (not shown). Of course, terms used herein such as "bottom," "front," "back," "right," left," "base," "bottom," "top," etc. merely indicate arbitrarily chosen surfaces of the devices and are not intended to limit the disclosure to any particular orientation or orientations of such devices. The surfaces may be two adjoining planes, such as the base (or bottom) of the housing and the side of the housing. In other words, a plane associated with one surface of the metallic component projects from a plane associated with another surface of the metallic component. Of course, this disclosure is not limited to embodiments having metallic components with strictly planar surfaces. Rather, the surfaces of the metallic components could be non-planar (for instance, curved). However, at least a portion of one surface of the metallic components define a plane which is "out of plane" (that is, non-parallel) to the plane associated with the corresponding receiving coil. Moreover, while FIG. 5 illustrates the ferrite guide 500 being positioned in a receiving device, no such limitation is implied. Indeed, ferrite guides 500 can be positioned in transmitting devices and such embodiments are within the scope of the disclosure.

With reference still to FIG. 5, the ferrite guide 500 of the current embodiment is generally adjacent to the receiving coil $506_{RX}$. More particularly, the planar portion 504 of the ferrite guide 500 is generally adjacent to and aligned with the receiving coil $506_{RX}$ or at least a portion thereof. Moreover, planar portions 504 of some embodiments correspond in shape and size to the shape and size of the receiving coil $506_{RX}$. However, planar portions 504 with shapes, sizes, etc. different from the shapes, sizes, etc. of the receiving coil $506_{RX}$ are envisioned and are within the scope of the disclosure. It is also noted here that the term "generally planar" indicates that the pertinent object is generally flat although it might have some irregularities associated therewith. For instance, an offset of a few millimeters between one portion of a generally planar object and another portion of that same object would not render it non-planar. Nor would a small amount of curvature, surface irregularities, etc. of the sort typically found in available "flat" coils and/or PCBs and particularly as these objects might be mechanically integrated into thin devices.

That being said, in the current embodiment, the metallic component 516 is positioned in at least one angle of the ferrite guide 500 and can therefore said to be "wrapped" by the same. In accordance therewith, the shield portions 503 and 505 extend at least partially along the corresponding edges of the metallic object. Thus, FIG. 5 illustrates ferrite guide 500 wrapping at least partially around the metallic component 516 and thus generally paralleling or corresponding in shape to at least one out of plane portion or surface of the metallic component 516. While FIG. 5 illustrates ferrite guide 500 conforming closely to the shape of the metallic component 516, no such limitation is implied. Instead, embodiments include ferrite guides 500 which allow gaps between themselves and metallic components 516 and which do not correspond in shape, or conform to, the metallic components 516. Even with such deviations, the ferrite guide 500 of the current embodiment would "wrap" the metallic component 516 as is meant within the current disclosure. In the current embodiment, though, the metallic component 516 and the receiving coil $506_{RX}$ sandwich the planar portion 504 of the ferrite guide 500 between themselves perhaps with some gaps there between. In addition, FIG. 5 illustrates the resulting assembly positioned in a side-by-side orientation relative to transmitting coil $506_{TX}$.

As is disclosed further herein (with reference to FIG. 4), the eddy currents in the metallic component 516 usually do not significantly affect the magnetic field 510 in the volume illustrated on the left side of FIG. 5. However, on the side of the transmitting coil $506_{TX}$ toward the receiving coil $506_{RX}$, the magnetic field 510 behaves differently with the ferrite guide 500 in place than as disclosed with reference to FIG. 4. While some of the diverted flux 512 and/or fringing flux 514 still flows around the metallic component 516, some of the diverted flux 512 and fringing flux 514 encounter the shield portion 503 on the side of the ferrite guide 500 positioned toward the transmitting coil $506_{TX}$.

Because of the relatively high magnetic permeability of the ferrite (or other material) from which the ferrite guide 500 is made, at least some of the diverted flux 512 and/or fringing flux 514 impinging on the shield portion 503 flows into the shield portion 503 of the ferrite guide 500. Furthermore, once therein, that portion of the diverted flux 512 and/or fringing flux 514 tends to follow the shape of the ferrite guide 500 from the shield portion 503 (where it entered) and into the planar portion 504. Thus, the shield portion 503 of the ferrite guide 500 blocks that portion of the diverted flux 512 and/or fringing flux 514 from encountering the metallic component 516 and therefore shields the metallic component(s) 516 behind it. Furthermore, that portion of the diverted flux 512 and/or fringing flux 514 that enters the shield portion 503 (and any flux that enters the planar portion 504 through its edge facing the transmitting coil $506_{TX}$) becomes concentrated in and flows along the planar portion 504 of the ferrite guide 500. But, it is believed that much more of that flux in the planar portion 504 is able to flow there from in a direction (downwardly) enabling it to penetrate the coil 504 (which is in relatively close proximity to the planar portion 504).

It is also believed that the foregoing effect is due at least in part to the shape of the ferrite guide 500, which facilitates the concentrated flux flowing in the planar portion 504 penetrating the receiving coil $506_{RX}$. As a result, more of that flux couples with the receiving coil $506_{RX}$ and induces electrical current therein then would otherwise have been the case without the ferrite guide 500. The coupling coefficient k, efficiency n, and system level quality factor Q of the overall system (the transmitting coil $506_{TX}$ and receiving coil $506_{RX}$) increases accordingly.

Moreover, in embodiments with more than one shield portions 503 and 505, additional coupling can be achieved between the transmitting and receiving coils $506_{TX}$ and $506_{RX}$. For instance, near the shield portion 505 on the side of the ferrite guide 500 opposite the transmitting coil $506_{TX}$, additional coupling can be achieved. In this situation, some of the diverted flux 512 will begin to arc downward as it flows passed the corresponding corner of the metallic component 516. Some of that diverted flux 512 will continue downwardly passed the shield portion 505. However, some of that diverted flux 512 will continue turning back toward the shield portion 505 and (because of its relatively high magnetic permeability) will enter therein. Again, the ferrite guide 500 guides that portion of the diverted flux 512 into the generally planar portion 504 of the ferrite guide 500 where it can couple with the receiving coil $506_{RX}$. It is noted here that both shield portions 503 and 505 of the current embodiment are out of plane with receiving coil $506_{TX}$ thereby facilitating their ability to capture flux that would otherwise evade coupling with the receiving coil $506_{TX}$.

Embodiments also provide systems in which both the transmitting coils $506_{TX}$ and receiving coils $506_{RX}$ have ferrite guides 500 associated therewith. Indeed, in some embodiments, only the transmitting coil $506_{TX}$ has a ferrite guide associated with it. Moreover, it is envisioned that instead of a coil antenna being used for the transmitting antenna, a quarter torus antenna may be employed.

No matter the type of antenna used as the transmitting antenna, the flux flowing through the portion of the planar portion 504 of the ferrite guide 500 nearest the transmitting coil $506_{TX}$ and the flux flowing through the opposite side of the planar portion 504 will have different directions. However, the directions of the flux in each of those portions of the planar portion 504 will (because of the mirrored geometry involved) correspond to the desired flux direction associated with the corresponding side of the receiving coil $506_{RX}$. Accordingly, the effects of having another shield portion 505 of the ferrite guide 500 include further increasing the coupling of the coils $506_{TX}$ and $506_{RX}$, the coupling coefficient k, the efficiency n, and the system level quality factor Q. WPT and NFC functions (as well as other near field coupling-related functions) should therefore be facilitated by embodiments. It is noted here that simulations of such systems showed that such effects should result. Indeed, improvements in coupling coefficients k, efficiencies n, and system level quality factors Q ranged by factors between about 2.5 and about 3.0 for typical thin devices 500 with flux guides 500 with thicknesses of between 1 and 3 mm and with coils simulated at center-to-center distances between 45 mm and 65 mm.

Some embodiments provide portable devices, which include housings, metallic components, coils, and flux guides. Typically, the metallic components are positioned within the housing and define at least two surfaces one, or more, of which is out of plane as compared to the coils. The coils define generally planar portions which are positioned in the housings and in close proximity to the metallic components. In the current embodiment, portions of the flux guides are positioned between the metallic components and the generally planar portions of the coils. In addition, the flux guides wrap at least partially around at least one out of plane surface of the metallic components.

In some embodiments, the portable devices are configured to be positioned side-by-side with other devices to perform near field coupling functions including wireless power transfer (WPT), near field communication (NFC), and a combination thereof. These portable devices can be (among others) mobile phones, cellular phones, smartphones, personal digital assistants, tablet computers, netbooks, notebook computers, laptop computers, multimedia playback devices, (digital) music players, (digital) video players, navigational devices, or digital cameras. In addition, the devices can be charging mats.

Moreover, in some embodiments, the coils can be configured to receive flux from fringing fields of transmission coils. Alternatively, in some embodiments, the coil can be configured to generate fringing fields (for coupling flux to receiving coils). These coils can be configured to resonate at either 6.78 MHz and 13.56 MHz or other frequencies. Various embodiments provide flux guides which are continuous and/or made of ferrite. In addition, or in the alternative, the flux guides can wrap at least partially around two, three, or more out of plane surfaces of the metallic components.

Some embodiments provide portable devices which include housings, metallic components, coils, and flux guides. Typically, the metallic components are positioned within the housing and define first and second adjoining surfaces at least one of which is out of plane with the coils. The coils are positioned in the housings and in close proximity to the metallic components and define generally planar portions. Furthermore, the flux guides define generally planar flux guide portions positioned between the generally planar coil portions and the metallic components.

These flux guides also define shield portions positioned adjacent to the out of plane surfaces of the metallic components.

Various embodiments therefore provide more user-friendly information and power sharing arrangements. For instance, embodiments improve the ability of electronic devices to perform WPT and NFC functions with fewer data dropouts, with fewer communication interruptions, with increased efficiency, etc. Some embodiments, moreover, allow for side-to-side bumping of devices for communicating information between the devices. For instance, embodiments allow side-to-side bumping for peer-to-peer NFC-based information sharing between tablet computing devices which would otherwise be ergonomically awkward if users had to comply with back-to-back bumping. In the alternative, or in addition, some embodiments allow for side-by-side power transfers as shown in FIG. 1B among other capabilities. For instance, embodiments provide demonstrated side-by-side wireless charging of smart phones from notebook computers.

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

What is claimed is:

1. A portable device comprising:
a housing having at least one metallic component positioned within the housing, the at least one metallic component defining at least two surfaces; a coil defining a generally planar coil portion which is positioned in the housing and proximate to the metallic component and being configured to couple with magnetic flux from a field, at least one surface of the metallic component being out of plane with the coil; and
a flux guide that includes a planar portion and two shield portions to form a letter "U" shape, the planar portion of the flux guide positioned between the metallic component and the generally planar coil portion, the two shield portions of the flux guide being wrapped around out of plane edge-surfaces of the metallic component to facilitate coupling the flux between the coil and the field.

2. A portable device as recited in claim 1, wherein the housing defines a side and wherein the portable device is configured to be positioned side-by-side with another device to perform near field coupling there between.

3. A portable device as recited in claim 1, wherein the coil is configured to receive flux from a field of a transmission coil.

4. A portable device as recited in claim 1, wherein the coil is configured to generate a field for coupling flux to a reception coil.

5. A portable device as recited in claim 1, wherein the flux guide is continuous.

6. A portable device as recited in claim 1, wherein the flux guide comprises ferrite material.

7. A portable device as recited in claim 1, wherein the coil is configured to resonate near a frequency selected from the group consisting of 6.78 MHz and 13.56 MHz.

8. A portable device as recited in claim 1, wherein the out of plane surface of the metallic component includes a surface that is not covered by the letter "U"-shaped flux guide.

9. A portable device as recited in claim 1, wherein the portable device is selected from a group consisting of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

10. A device comprising:
a housing having at least one metallic component positioned within the housing, the metallic component defining at least a first surface, a second surface, and two edge-surfaces;
a coil defining a plane and a generally planar coil portion in parallel with the plane and which is positioned in the housing and proximate to the metallic component; and
a flux guide that includes a generally planar portion and two shield portions to form a letter "U" shape, the generally planar portion of the flux guide is positioned between the generally planar coil portion and the first surface of the metallic component, the two shield portions of the flux guide being wrapped around the two edge-surfaces of the metallic components.

11. A device as recited in claim 10, wherein the housing defines a side and wherein the device is configured to be positioned side-by-side with another device to perform near field coupling operation.

12. A device as recited in claim 11, wherein the near field coupling operation selected from the group consisting of wireless power transfer (WPT), near field communication (NFC), and a combination thereof.

13. A device as recited in claim 10, wherein the coil is configured to receive flux from a field of a transmission coil.

14. A device as recited in claim 10, wherein the coil is configured to generate a field for coupling flux to a reception coil.

15. A device as recited in claim 10, wherein the flux guide is continuous.

16. A device as recited in claim 10, wherein the flux guide is made of ferrite.

17. A device as recited in claim 10, wherein the coil is configured to resonate near a frequency selected from the group consisting of 6.78 MHz and 13.56 MHz.

18. A device as recited in claim 10, wherein the second surface of the metallic component is not covered by the letter "U"-shaped flux guide.

19. A device as recited in claim 10, wherein the device is selected from a group consisting of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

20. A portable device comprising:
a housing defining a side wherein the portable device is configured to be positioned side-by-side to perform a near field coupling-related function with another device positioned proximate to the side, the housing having at least one metallic component positioned within the housing, the at least one metallic component defining first and second surfaces, a generally planar coil defining a plane and being positioned in the housing and proximate to the metallic component, wherein the coil is configured to receive flux from a fringing field of a transmission coil and wherein the second surface of the metallic component projects away from the plane of the coil; and a continuous flux guide made of ferrite and defining a generally planar flux guide portion with extended shield portion at each end of the generally planar flux guide portion, wherein the generally planar flux guide portion is positioned between the generally planar coil and the first surface of the metallic-component, wherein each of the extended shield portion of the flux guide being wrapped around out of plane edge-surfaces of the metallic component.

21. A device as recited in claim 20, wherein the near field coupling-related function is selected from the group consisting of a wireless power transfer (WPT), a near field communication (NFC) function, and a combination thereof.

22. A device as recited in claim 20, further comprising a processor and memory in the housing.

* * * * *